Dec. 31, 1929.                K. F. PIETZSCH                    1,741,334
                                  FILTER
                           Filed June 7, 1928           2 Sheets-Sheet 1

Kurt F. Pietzsch
     INVENTOR.
BY Robert Ames Norton
        ATTORNEY

Dec. 31, 1929.     K. F. PIETZSCH     1,741,334
FILTER
Filed June 7, 1928     2 Sheets-Sheet 2

Kurt F. Pietzsch
INVENTOR.

BY Robert Auer Morton
ATTORNEYS.

Patented Dec. 31, 1929

1,741,334

UNITED STATES PATENT OFFICE

KURT F. PIETZSCH, OF PITTSBURGH, PENNSYLVANIA, ASSIGNOR, BY MESNE ASSIGNMENTS, TO THE SELDEN RESEARCH & ENGINEERING CORPORATION, OF PITTSBURGH, PENNSYLVANIA, A CORPORATION OF DELAWARE

FILTER

Application filed June 7, 1928. Serial No. 283,493.

This invention relates to filters and more particularly to filters capable of complete enclosure during operation.

Nutsch filters in which solids are separated from liquids by filtering through a screen or perforated plate are usually operated so as to compact the cake, especially when vacuum filtration is used, and to aid the filtering action by mechanical pressure on the cake. A very simple type of apparatus is used in which compacting of the cake is effected manually. This type of filter is very satisfactory where filtration takes place at moderate temperatures with solvents such as water which do not give off inflammable or toxic vapors and where loss of solvent by evaporation is of minor importance owing to its low cost. Where more expensive solvents are used and especially where it is necessary to use solvents or operate under conditions where dangerous vapors are evolved, as for example when organic solvents are used, it is desirable to enclose the filter during filtration and in such cases it is a comparatively difficult matter to effect a satisfactory nutsch action.

The present invention is directed to a design of nutsch filter which can be operated completely enclosed during the whole filtration and during removal of the cake. The filter of the present invention also possesses the advantage that a very even and gradually regulatable compacting is obtained and a very efficient mechanical discharge is provided.

In the filter of the present invention a screen is mounted in a closed chamber as in an ordinary closed filter and rotating means are provided which move over the cake to compact it and to agitate the slurry above it. In one position, usually in one direction of rotation, the rotating device smooths and compacts the cake; in another position, usually when rotated in the reverse direction, the device acts as a scraper which scrapes off the cake, discharging it either outwardly or inwardly to suitable discharge openings. The dual function performed by the rotating means constitutes the essential and most important advantage of the present invention.

While the filters embodying the principles of the present invention are applicable to the filtration of any material which can be screen filtered, they are particularly important for filtration of mixtures where evaporation of the solvent is to be avoided, as is the case with numerous organic solvents. The invention will be described in connection with filtration of a slurry of crude or partly purified anthracene and furfural and the description will also bring out a further advantage of the present invention, permitting effective washing in the filter without loss of wash liquid by vaporization. In the description, as applied to a representative process, the washing is carried out by means of benzol, illustrating a solvent which is volatile and produces vapors which are both toxic and highly inflammable. It should be understood, of course, that while the filter of the present invention is peculiarly adapted to the filtration of furfural-anthracene mixtures, it is applicable to all other types of mixtures suitable for screen filtration and the description merely illustrates a representative embodiment.

Two general types of filter construction are shown in the drawings, namely rigidly driven smoothing and plowing means and flexibly driven means.

In the drawings

Figure 1:
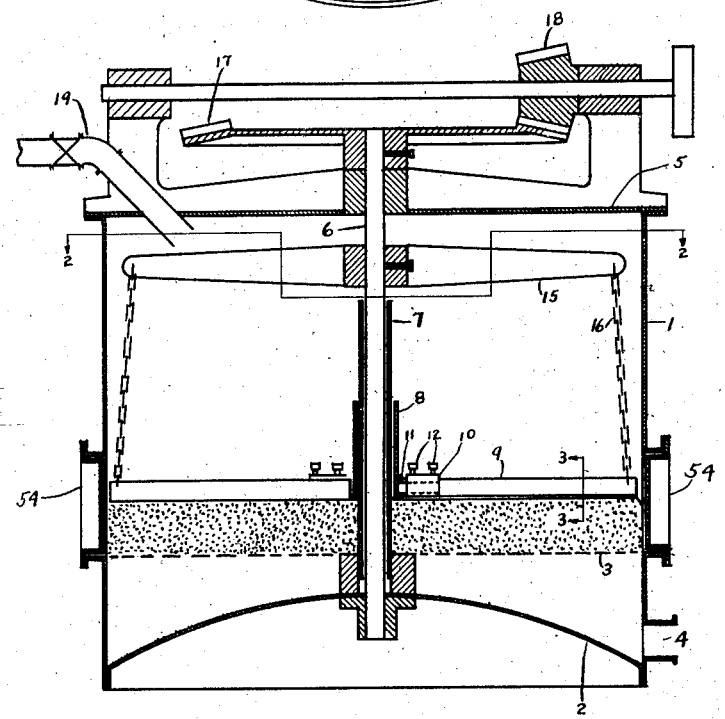
Fig. 1 is a vertical section through a closed filter showing a flexibly driven smoothing and plowing means.
Figure 3:
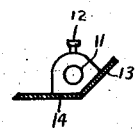
Fig. 3 is a detail vertical section of the plowing mechanism at right angles to Fig. 1 taken along the line 3—3.

In the construction shown in Fig. 1, the filter consists of a shell 1, a bottom piece 2 which forms with the screen 3 a filtrate chamber provided with exit pipe connection 4. A top cover 5 is provided through which the valved slurry intake pipe 19 and a rotating shaft 6 extend. This shaft is centrally located and turns in bearings in the bottom piece 2. The shaft turns in a sleeve 7 and is rotated by means of a gear 17, meshing with a pinion 18 driven from any suitable source of power, which can be reversed. A pair of arms 15 are firmly fastened to the shaft 6 by means of set screws or other suitable fastenings and rotate with it. These arms are positioned below the top piece 5 and are provided at their ends with chains 16 somewhat longer than the vertical distance between the arms and screen 3. The other ends of the chains are connected to the ends of a rotary sledge 9 consisting of two sledge arms which are provided at their ends with drilled bosses 10 into which studs 11 fit and are held in adjustment by set screws 12. These studs 11 are rigidly mounted in a sleeve 8 which is capable of free rotation around and longitudinal movement on the sleeve 7. The sledge arms are in the form of an obtuse angle, the shorter side of the angle 13 acting as sledge runner and the long side 14 acting as a plow.

Figure 2:
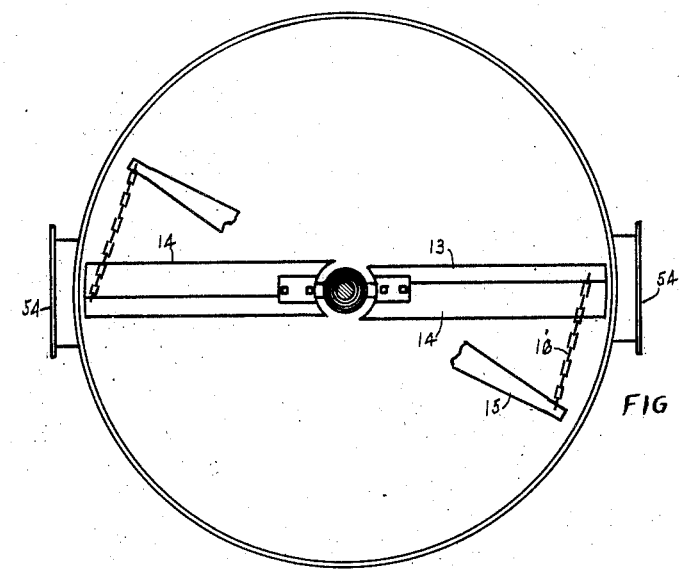
Fig. 2 is a horizontal section of Fig. 1 along the line 2—2.

In operation the sledge is set at the correct angle and held by the set screws 12. A slurry of furfural and anthracene flows in through the pipe 19 and the shaft 6 begins to rotate in a counterclock-wise direction when looking down on the filter. The arms 15 are somewhat in advance of the sledge arms 9 because of the length of the chains 16 and draw the sledge over the filter. The movement of the sledge keeps the slurry agitated and as the anthracene cake builds up the sledge rides over it, smoothing and compacting the cake in a uniform and very effective manner. When sufficient cake has been built up the flow of slurry is stopped, preferably the last of the solvent sucked out by means of a vacuum applied to the filter or if desired the filtration can be continuously effected under a vacuum. When the last of the solvent is removed mechanically, benzol can be introduced through the pipe 19, is uniformly distributed over the cake by the rotating sledge and serves to displace the more expensive furfural, also washing the cake and removing some remaining phenanthrene. When the cake has been sucked as dry as possible after the benzol wash, the rotation of the arms 15 is reversed and the discharge openings 54 are uncovered. The clock-wise rotation of the arms, which is shown in Fig. 2, reverses the direction of the rotation of the sledge arms and causes the edges of the plow faces 14 to dig into the cake, shaving off successive portions and discharging them through the openings 54 until all of the cake has been so discharged. If desired the edge of the side 14 can be somewhat tapered in order to improve the discharging action. When the cake has been entirely discharged the rotation of the arms is reversed, the discharge openings are closed and the filter is ready to filter a second batch.

It should be noticed that all of the operation was carried out in a completely closed apparatus and there is, therefore, no loss of expensive, toxic, or inflammable vapors during operation for, of course, the discharge openings 54 may be connected to pipes providing a closed discharge where this is desirable. Maximum economy of solvents, complete absence of fire and toxic vapor hazard and a very efficient nutsch filter is provided. The apparatus is simple, rugged, and operates for long periods of time without attention.

Figure 5:
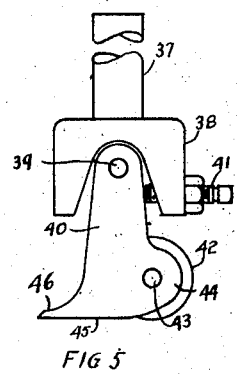
Fig. 5 is a detailed vertical elevation of a plow shown in Fig. 4.
Figure 4:
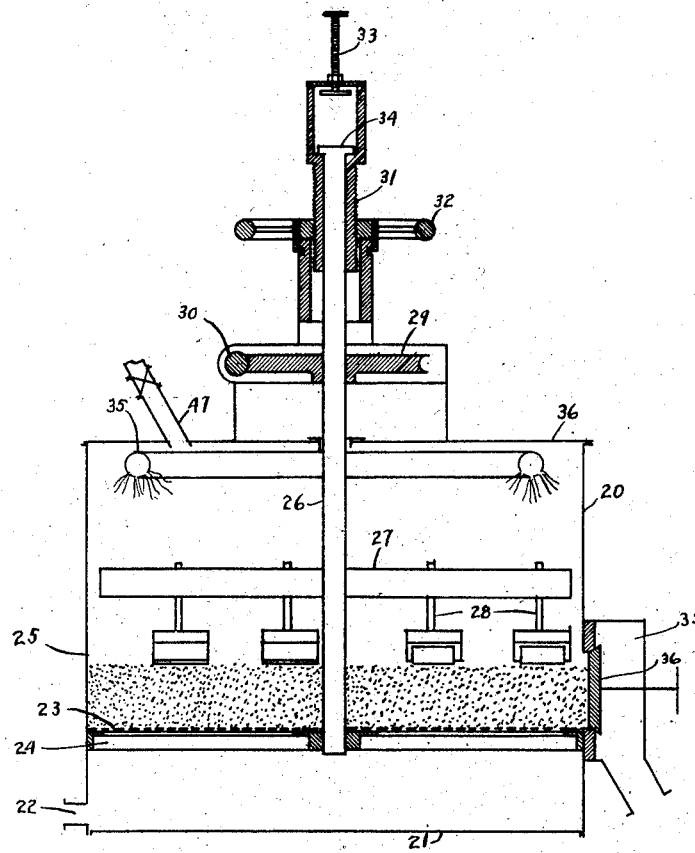
Fig. 4 is a vertical section through a filter showing rigidly driven smoothing and plowing means.

While the device shown in Figs. 1 and 2 represents a very simple and effective filter, it operates solely by the weight of the sledge arms and there is, therefore, no control of the pressure on the cake or of the depth of the plow cut. Moreover, the compacting starts at once and it is not possible to adjust the degree of compacting during operation. It has, therefore, been found desirable in many installations to provide for a positive control and for this purpose a modified filter shown in Figs. 4 and 5 has been designed. This filter consists of a shell 20, a screen 23 supported by stiffening ribs 24 and bottom piece 21 with a discharge opening 22, a top piece 36 and a shaft 26 passing through the top piece 36 and having a central bearing supported by the stiffening ribs 24. To this shaft is rigidly attached a pair of arms 27 which carry a plurality of plows and smoothers 28 (shown in detail in Fig. 5). The rotation of the shaft is effected by the worm gear 29 and worm 30 which may be driven from any suitable reversible source of power. The shaft has a flanged upper head 34 carried by a frame 31 which is provided with a screw threaded portion engaging internal threads on a hand wheel 32. A screw 33 is also provided which permits applying positive pressure to the head 34 where this is desired.

The plows (shown in Fig. 5) consist of shafts 37 which are rigidly mounted in the arms 27, each shaft carrying a head 38 in which a plow 40 is mounted on a pin 39. The plow is capable of limited rocking motion about the pin 39, controlled by the adjusting screw 41. The plow itself carries a roller or series of rollers 42 on one face, the rollers being on pins 43 which pass through cheeks 44 on the main plow casting. The bottom of the plow possesses a flat surface 45 and a sharp rear edge 46.

In operation a furfural-anthracene slurry is introduced through the valved pipe 47 and the shaft 26 is rotated in such a direction as to cause the plows to move clock-wise when viewed from the top of the filter. This causes the rollers 42 to first encounter the anthracene cake 25 and the friction rocks the plows backwardly on the pins 39, lifting the cutting edges 46 clear of the cake. The height of the plow and smoothers is adjusted by hand wheel 32 and the smoothing action can start at any desired cake thickness. If the screw 33 is loosened the pressure on the cake is only that due to the weight of the shaft 26, arms 27 and plows 28, the shaft, of course, being capable of vertical movement in the hub of the worm gear 29 and in the frame 31. If the screw 33 is turned down, of course the pressure is positively determined by the adjustment of the hand wheel 32.

After the cake has been built up to the desired height the flow of furfural and anthracene is shut off, the furfural is sucked through the cake as far as possible and then the cake is washed with a spray of benzol from the spray pipe 35, the smoothing action of the rollers continuing. After sucking off the benzol the rotation of the shaft is reversed, the friction causes the plow to rock back on the pins 39 and the sharp cutting edges 46 bite into the cake plowing it out toward the periphery where the valve 36 in the discharge pipe 35 is opened and the cake is discharged. The hand wheel may be accurately lowered and the depth to which the plows bite in can either be determined by the weight of the rotating parts or when the screw 33 is turned down a positive adjustment of the cut is obtained by the hand wheel 32.

Figure 6:
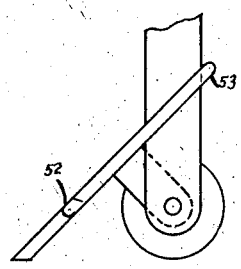
Figs. 6 and 7 are detailed elevations of a modified plow type for unidirectional rotation, Fig. 6 showing the plow in plowing position and Fig. 7 showing it in compacting position.
Figure 7:
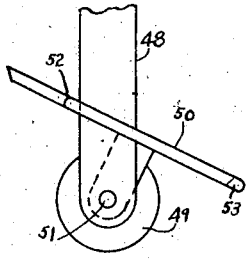

Filters shown in Figs. 1 to 5 require a reversible power source. Where a non-reversible power source is available or desirable a somewhat different design of plow may be used, such as that shown in Figs. 6 and 7. These plows consist of shafts 48, rollers 49, and plow faces 50 which are capable of rocking on pins 51 into either of the two positions shown in Figs. 6 and 7, the amount of rock being determined by stops 52 and 53. The rocking can be effected manually or preferably through suitable controls on the rotating arms. When the rotation is such as to move the rollers from right to left in Figs. 6 and 7 and when the plow face 50 is in the position shown in Fig. 7 the rollers will smooth or compact the cake whereas when the plow face is arranged in the position in Fig. 6 it will bite in and plow out the cake.

The invention has been described in connection with two typical practical filter devices and has been described in connection with a representative filtering process. It should be understood that the drawings are to a large extent diagrammatic in nature, the exact structural design of many of the component parts with the exception of the actual plowing and smoothing mechanism being merely shown conventionally as, of course, the design of filter structure, wash pipes, gears, shafts, discharging pipes and the like can be varied to suit particular conditions and any suitable type of structure may be used. Where hot filtration is desired the filter can be jacketed, lagged or otherwise suitably heat insulated. The present invention is applicable to all filters under ordinary pressure, vacuum filters, pressure filters or combination of vacuum and pressure. The structural design can be modified within wide limits without departing from the scope of the invention and it should be understood that the invention is in no way limited to the precise details illustrated in the drawings which are merely designs of representative embodiments of the principles of the present invention.

The filter of the present invention has been described in connection with closed filtrations, a field in which it is preeminently adapted and possesses peculiar advantages. It should be clearly understood that the advantages of uniform and effective compacting and mechanical discharge may, however, be enjoyed in an open filter where the solvent used is of such a nature as to make this type of filter satisfactory. The only change in construction, of course, consists in the elimination of the top cover as would be clear to any engineer.

What is claimed as new is:

1. A closed filter comprising in combination a closed filtration chamber having a screened bottom, combined compacting and discharging means in said chamber so constructed as to be capable at will of either discharging or compacting alone, but not both operations simultaneously and means for introducing mixtures of liquids and solids into said chamber.

2. A filter comprising in combination a filter chamber having a screened bottom, combined compacting and plowing means in said chamber adapted to be rotated over the cake and so constructed as to be capable at will of either compacting the cake alone or plowing the cake alone, but not of carrying out both operations simultaneously, discharge openings so placed as to permit discharge of the cake by the plowing mechanism, and means for introducing a mixture of solids and liquids into the filter chamber.

3. A filter comprising in combination a filter chamber having a screened bottom, at least one discharge opening in the side of the chamber immediately above the screen, a vertical rotatable shaft centrally mounted in said chamber and combined plowing and compacting means driven by said shaft over the cake formed during filtration, said means being so constructed as to be capable at will of either compacting the cake alone or to plow the cake formed out through the discharge openings, but not being capable of performing both of these operations simultaneously and means for introducing a mixture of solids and liquids into said chamber.

4. A filter comprising in combination a chamber having a screened bottom, at least one discharge opening in the side of the chamber immediately above the screen, a vertical rotating shaft centrally mounted in said chamber and means for rotating said shaft in either direction, plowing and compacting means rotated by said shaft, said means being adapted to compact a cake formed in the filtration in one direction of rotation and to plow out said cake through the discharge opening in the reverse direction of rotation.

5. A filter according to claim 3 in which the filter chamber is completely enclosed and means are provided for introducing a mixture of solids and liquids to be filtered into the filter without opening the latter to the atmosphere.

6. A filter according to claim 4 in which the filter chamber is completely enclosed and means are provided for introducing a mixture of solids and liquids to be filtered into the filter without opening the latter to the atmosphere.

7. A filter comprising in combination a filter chamber with a screened bottom, at least one discharge opening immediately above the screen, a vertical shaft centrally mounted in said filter chamber and capable of being rotated in either direction and of longitudinal movement, a plurality of arms rigidly attached to said shaft and provided with plowing and smoothing members which in one direction of rotation operate to smooth and compact any cake formed on the filter and in the reverse direction to plow out the cake to the discharge opening and means for moving the shaft longitudinally without stopping its rotation and means for introducing a mixture of solids and liquids into the filter chamber.

8. A filter according to claim 7 in which the filter is completely enclosed and means are provided for introducing solids and liquids without opening the chamber to the atmosphere.

9. A filter according to claim 7 in which the plowing and compacting members consist of metallic castings having a roller at one end and a sharp plowing face at the opposite edge, said castings being mounted on pins in heads rigidly attached to the rotating arms and being capable of limited rocking motion on the pins on an axis parallel to the arm to which the head is attached.

10. A filter according to claim 7 in which means are provided for washing the filter cake in the filter without opening the latter to the atmosphere.

11. A filter according to claim 7 in which the discharge opening is connected to a closed discharge system.

Signed at Pittsburgh, Pa., this 4th day of June, 1928.

KURT F. PIETZSCH.